Figure 1:
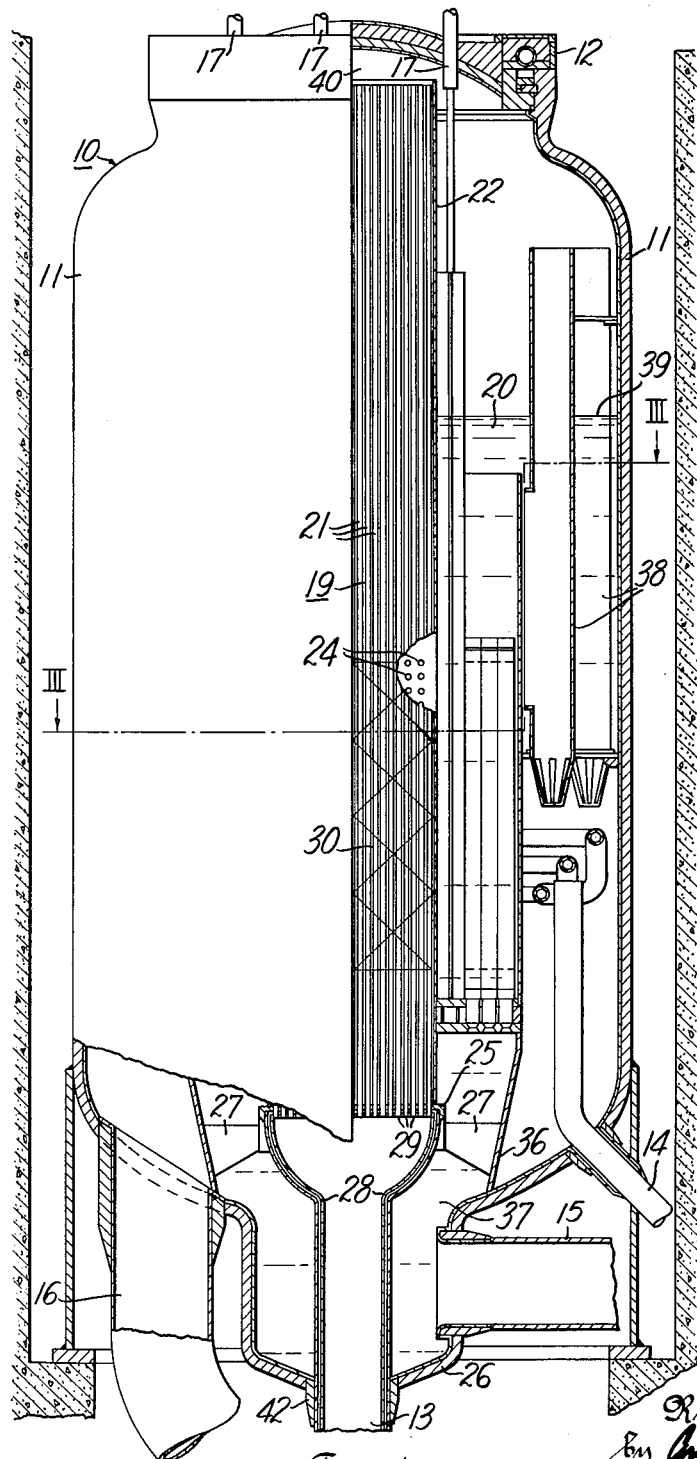

May 15, 1962 R. J. HOLL ET AL 3,034,977
NUCLEAR SUPERHEATER FOR BOILING WATER REACTOR
Filed March 18, 1958 3 Sheets-Sheet 1

Inventors
Robert J. Holl
Raymond W. Klecker
by Arthur M. Streich
Attorney

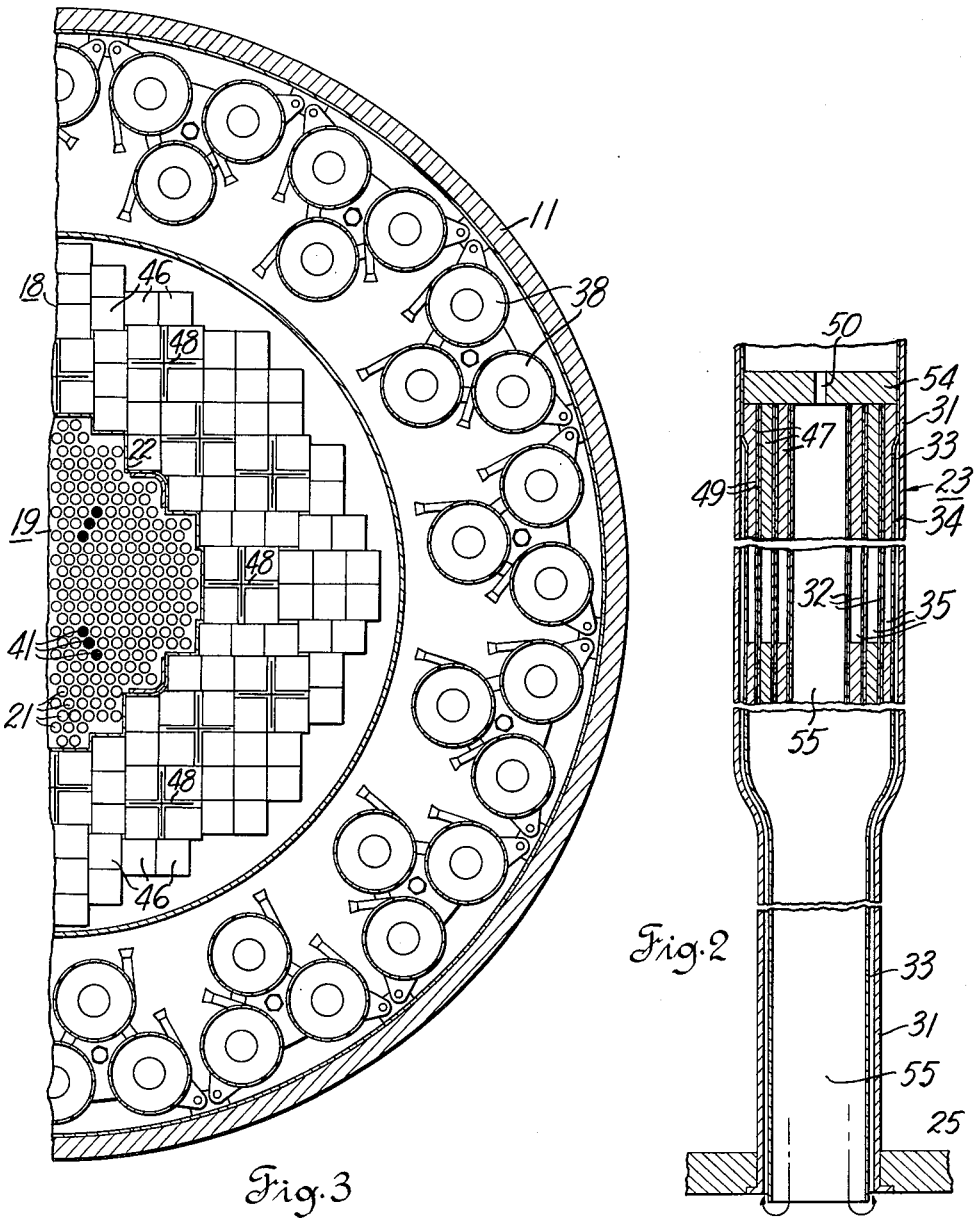

May 15, 1962 R. J. HOLL ET AL 3,034,977
NUCLEAR SUPERHEATER FOR BOILING WATER REACTOR
Filed March 18, 1958 3 Sheets-Sheet 3

Inventors
Robert J. Holl
Raymond W. Klecker
by Arthur M. Struich
Attorney

United States Patent Office 3,034,977
Patented May 15, 1962

3,034,977
NUCLEAR SUPERHEATER FOR BOILING
WATER REACTOR
Richard J. Holl, Greenfield, Raymond W. Klecker, West
Allis, and Clifton B. Graham, Elm Grove, Wis., assignors, by mesne assignments, to the United States of
America as represented by the United States Atomic
Energy Commission
Filed Mar. 18, 1958, Ser. No. 722,274
1 Claim. (Cl. 204—193.2)

This invention relates to boiling water reactors for atomic power plants and more particularly to a new and novel means for producing and superheating steam by utilizing the heat of a nuclear fission chain reaction in a two region controlled recirculation boiling reactor.

In neutronic reactors, a self-sustaining chain reaction of neutrons evolves heat. In general, neutronic reactors contain fissionable material and a moderator which slows the neutrons to thermal energies, thereby heating a coolant, which may be the moderator, to generate steam. Specific details of the theory and essential characteristics of such reactors are set forth in the patent to Enrico Fermi and Leo Szilard, U.S. 2,708,656, granted May 17, 1955. This invention relates specifically to a boiling water reactor of the type that has been built at the Argonne National Laboratories and described in literature at the Argonne Experimental Boiling Water Reactor.

In the past, several methods of superheating steam generated in the neutronic reactors were utilized. The steam could simply be heated in other fuel fired superheaters or an individual reactor superheater could be designed, based upon the principle of a gas cooled high temperature reactor, to receive the saturated steam to cool the reactor and heat the steam to the desired temperature.

In the case of an individual reactor designed to generate and superheat steam, it was thought necessary to dry and superheat the wet steam by providing the reactor with special "cooling channels." Therefore, considerable piping either internally or externally was thought to be required.

To overcome the extensive piping as utilized in the prior art, the present invention utilizes a special design of the active portion in a controlled recirculation boiling reactor. In the reactor of the present invention, superheated steam is obtained during a single continuous path that lies wholly within a nuclear reactor having two separate close coupled regions. In one region steam is generated by conventional nuclear reactor boiling fuel elements and rises above the water level thereafter entering a second region for a downflow trip to become superheated by special nuclear fuel elements.

The superheating region consists of materials capable of withstanding high temperatures and is essentially a gas cooled reactor. A multiplicity of centrally located tubes are surrounded by a wall, perforated to allow the moderator to circulate therethrough. On the outside of the tubes and the inside of the wall, water, at saturation temperature, is present. The tubes contain a special nuclear fuel assembly which has means to thermally insulate the superheated steam passing therethrough by a layer of stagnant steam.

The boiling region consists of conventional nuclear core assemblies that completely surround the superheating region. The moderator in the boiling region is water, which absorbs the fission energy generated and forms steam. Saturated steam generated in this boiling water region rises to the dome of the reactor where the steam pressure is sufficient to result in a downward flow through the superheater fuel assemblies wherein heat is added to raise the steam temperature. It is then collected in a steam manifold in the lower portion of the reactor and piped to the outside and directly to the turbine.

An object of this invention is to utilize the heat of a nuclear fission chain reaction to produce superheated steam in an internal two region controlled recirculation boiling reactor.

Another object is to provide a new and novel method of utilizing a neutronic reactor having a superheater region, wherein the superheater is gas and water moderated.

Another object of the invention is to provide thermal insulation between the superheated steam and the moderator by a double walled cylinder having entrapped stagnant steam in the annular region between the walls.

Another object of this invention is to design a reactor as above set forth wherein steam is efficiently superheated in spaced relationship to fissionable material arranged in concentric sleeves in a special superheating fuel assembly.

Figure 4:
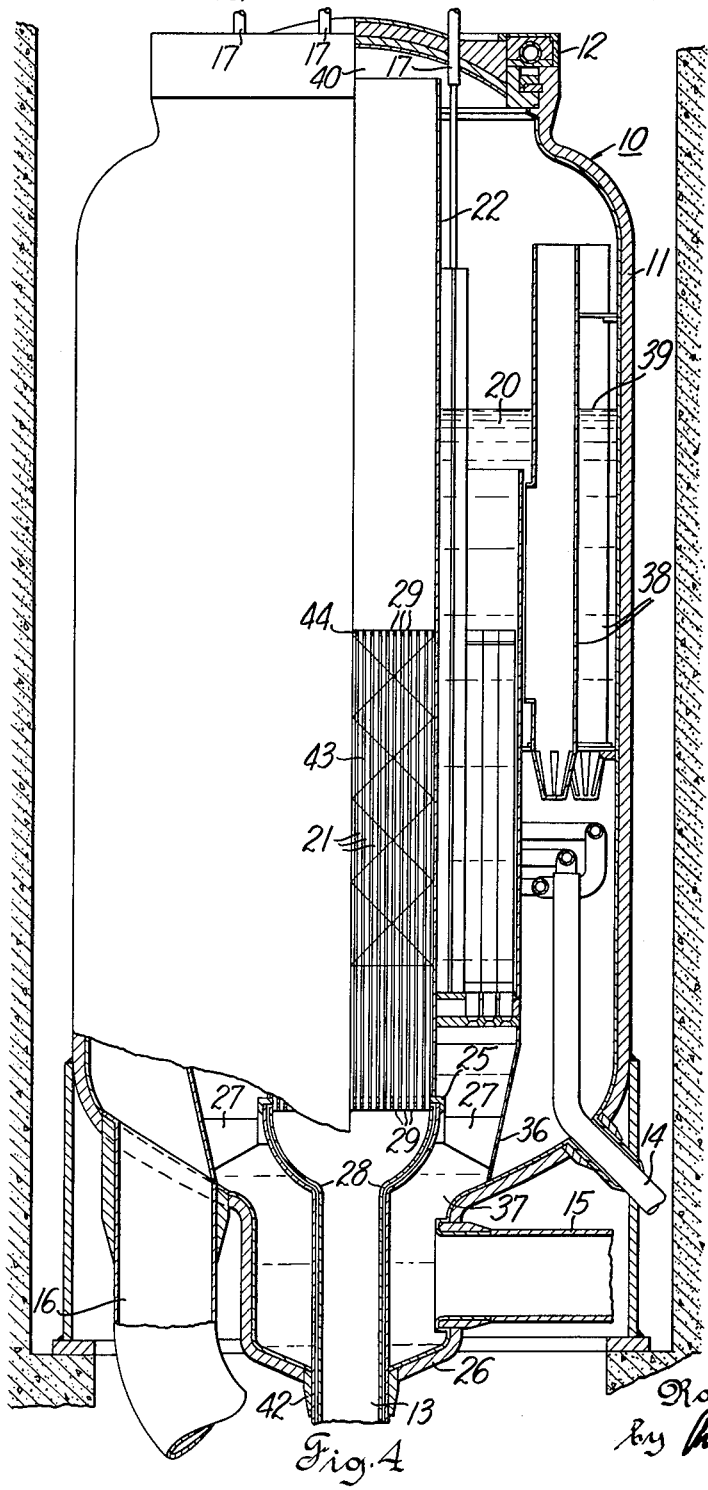

Other objects and advantages will be apparent to one skilled in the art from the following description taken with the accompanying drawings, in which:

FIG. 1 is a side elevation partial section showing the preferred embodiment of the invention;
FIG. 2 is a cross section of a single superheater tube;
FIG. 3 is a cross section of FIG. 1 at line III—III; and
FIG. 4 is another embodiment of the invention.

Referring to the drawings, particularly to FIG. 1, a reactor 10 is a pressure tight closed vessel 11 having a removable cover 12 that is provided with suitable external connections for a steam outlet 13, a feed water inlet 14 and means providing controlled recirculation shown as conduits 15, 16 within the boiling water section 18 of the reactor. Suitable control rods 48, as shown in FIG. 3, and control rod positioning means 17 are placed within the reactor 10 to control the rate of reaction. The control rod positioning means 17 can regulate the chain reaction in the superheating section 19, but are principally intended for the boiling section 18 inasmuch as the superheating section 19 is essentially self-regulating, for reasons that will be explained.

The reactor 10 comprises a vessel 11, a fissionable nuclear core assembly having two internal sections, an annular first section 18 in which heat is developed to boil a liquid moderator 20 and change it to steam, hereinafter referred to as the boiling section 18, and a second section 19 in which heat is developed for superheating the steam, hereinafter referred to as the superheater section 19.

Within the reactor vessel 11, the superheater section 19 is disposed within the cylindrical space defined by the annular boiling section 18 and projects vertically above the boiling section 18. Suitable moderator supply means 14 are provided to maintain the liquid moderator 20 level above the top of the boiling section 18 but below the top of the superheating section 19.

The superheater section 19 comprises a plurality of vertical tubes 21 having suitable horizontal spacing means (not shown) surrounded by a vertical dividing wall, hereinafter referred to as the superheater wall 22, and fuel elements 23 (shown in FIG. 2) or reactor control means 41 (FIG. 3) within each tube.

The superheater wall 22 is vertically spaced above the bottom of the vessel 11 by means of a steam manifold 28. The steam manifold 28 is rigidly mounted to the bottom of the vessel 11 by means of bracing member 42. Horizontal spacing of the steam manifold is provided by spacers 27. The superheater wall 22 is provided with perforations 24 to allow the moderator 20 to freely circulate therethrough by convection.

A grid plate 25 is vertically spaced above the vessel bottom 26 by means of horizontal spacers 27 and a steam manifold 28. The grid plate 25 is provided with apertures 29, extending between the superheater fuel element area 30 and the steam manifold 28. One aperture 29 is provided for each superheater tube 21.

Each tube 21 within the superheater wall 22 is centered over an aperture 29 defined in the grid plate 25 and hermetically sealed thereto, allowing the tube 21 to communicate with the steam manifold 28. The tubes 21 extend upward from the grid plate 25, the tops of the tubes 21 being parallel to the top of the superheater wall 22. Suitable spacing means (not shown) are provided to maintain horizontal space arrangement of the tubes 21 within the superheater wall 22.

In a second embodiment, as shown in FIG. 4, it is likewise possible to circulate the moderator 20 solely through a nuclear fuel area 43 of the superheater assembly by providing a second grid plate 44 vertically spaced above the grid plate 25 defined. The uppermost grid plate 44 will have a like number of apertures 29 as the lower grid plate 25 and the tops of the tubes 21 will be hermetically sealed to the upper grid plate 44 allowing the steam above the grid plate 44 to communicate with the steam manifold 28. The moderator 20 will then be circulated between the superheater tubes 21 disposed between the two grid plates 25, 44 by suitably located perforations (similar to perforations 24 in FIG. 1) in the superheater wall 22. The superheater wall 22 above the uppermost grid plate 44 will be imperforate to prevent moderator 20 from entering the superheater fuel assemblies 23.

A fuel assembly comprises a double walled cylinder 31, 33 of suitable material, such as stainless steel, and contains nuclear fuel elements 32. The upper portion of the cylinder 31, 33 is provided with suitable removal means (not shown). The removal means have inlet passageways (not shown) communicating with the interior of the cylinder 31, 33. Double walls 31, 33 are radially spaced and sealed at their upper ends adjacent nuclear fuel support member 54 to form annular area 34 therebetween which is closed at the upper end. At the lower portion of the cylinder 31, 33 suitable sealing and locking means (not shown) are provided to seal the outer double wall 31 to the grid plate 25, allowing the inner wall 33 to pass through the aperture 29 and into the steam manifold 28. The cylinder 31, 33 being affixed solely at a single point, is free to expand or contract with temperature variations. Since the double walls are sealed at their uppermost ends, gas passing into this annular area 34 from the steam manifold is entrapped to provide thermal insulation for the superheated steam.

Within the cylinder 31, 33 a plurality of concentric fuel elements 32, as shown in FIG. 2, are spaced from the interior wall 33 of the double walled cylinder 31, 33 by suitable spacing means 47. A supporting member 54 provides mounting means for supporting the fuel elements 32. Each fuel element is a sleevelike layer of nuclear fuel clad on its interior and exterior surfaces with a layer of stainless steel. Means are provided, such as ports 35, to interconnect the annular passageways 49 to the circular passageway 55. Steam enters the cylinder 31, 33 through the inlet passageway in the fuel assembly removal means and through the aperture 50 defined in support member 54 to enter the annular passageways 49 and circular passageway 55 formed by the concentric fuel elements 32, thereafter passing into the steam manifold 28.

Superheated steam entering the steam manifold 28 is piped to the exterior of the reactor vessel 11 by a suitably insulated steam discharge conduit 13. The fuel elements 23 in the superheater section 19 are capable of withstanding high temperatures, and are designed to provide superior heat transfer between the thermal neutron fissionable material 32 and the steam inside the cylinder 31, 33.

The boiling section 18 and the superheating section 19 have a common source of neutrons. In event the reaction generates excessive heat, i.e., the power factor increases, both sections are proportionally affected. In the boiling section 18, the formation of steam bubbles increases, reducing the effect of the water moderator thereby reducing the power coefficient within the boiling section; in the superheating section the transfer of heat will also extend through the double walled cylinders 31, 33 to heat the surrounding liquid moderator 20. The liquid moderator 20 will then turn to steam and slow the reaction to the prescribed rate. In essence, the reactor 10 is automatically self-conttrolled.

The boiling section 18 is conventional, consisting of conventional core elements 46 that completely surround the superheater section 19. The boiling section 18 is vertically spaced above the bottom 26 of the reactor vessel 11, being supported by a wall member 36 and the superheater section wall 22. The wall member 36 is affixed to the outer periphery of the boiling section 18 and extends downward to the bottom of the reactor vessel 11, being mounted thereto, to form an annular recirculation intake chamber 37.

Suitable externally located pumping means (not shown) are provided for recirculation of the moderator 20 within the boiling section 18. Conduit 15 connects the recirculation inlet chamber 37 to the outlet of the pumping means and conduit 16 connects the reactor vessel 11 interior to the inlet of the pumping means. Suitably mounted steam separators 38 are provided within the reactor vessel 11 to prevent entrapped steam from entering the conduit 16 connected to the inlet of the pumping means. This prevents cavitation in the pumping means which would reduce the pumping efficiency.

In operation, water moderator 20 enters vessel 11 through feed water inlet 14. Water moderator 20 is in heat exchange relationship with the fuel elements in boiling assembly 18 and forms steam which rises above the moderator 20 and accumulates in steam dome 40. The superheater fuel elements define passages which extend through the superheater section 19 and connect the steam dome 40 to the steam outlet 13.

While but two embodiments of the present invention have been shown and described, further embodiments or combinations of those described herein will be apparent to one skilled in the art without departing from the spirit of the invention or from the scope of the appended claim.

What is claimed is:

A water cooled and moderated nuclear reactor comprising a vessel having a water inlet and a steam outlet, fuel assemblies containing fissionable material within said vessel arranged to form an outer annular core section in communication with said water inlet and an inner core section surrounded by said outer core section, a body of water moderator in coacting relation with said fuel assemblies and submerging said outer core section, said inner core section comprising a plurality of individual tubular fuel assemblies presenting passages therethrough in heat exchange relationship with the fissionable material therein and communicating at their opposite ends with a space within said vessel above said moderator and with said steam outlet, respectively, each of said tubular fuel assemblies comprising a double walled cylinder housing a plurality of concentric, spaced tubular fuel elements containing fissionable material, said double walled cylinder comprising radially spaced walls connected together at their upper ends so that the space between said walls will be closed at the top and open at the bottom of said inner core section, and a circumferential wall element between said inner and outer core sections, said wall element having a perforated lower portion immersed within said body of water moderator.

References Cited in the file of this patent

UNITED STATES PATENTS

| | | |
|---|---|---|
| 2,787,593 | Metcalf | Apr. 2, 1957 |
| 2,806,820 | Wigner | Sept. 17, 1957 |
| 2,915,446 | Liljebald | Dec. 1, 1959 |
| 2,936,273 | Untermyer | May 10, 1960 |
| 2,938,845 | Treshow | May 31, 1960 |

FOREIGN PATENTS

| | | |
|---|---|---|
| 553,050 | Belgium | Dec. 15, 1956 |
| 1,141,064 | France | Mar. 11, 1957 |

OTHER REFERENCES

Proceedings of the International Conference on the Peaceful Uses of Atomic Energy, held in Geneva, Aug 8–Aug. 20, 1955, vol. 3, Power Reactors, United Nations, N.Y., 1955, pages 250–262. (Copy in Library.)